United States Patent [19]

Weimer et al.

[11] 3,962,196

[45] June 8, 1976

[54] TECHNIQUE FOR REDUCING POLYMER DEPOSIT DURING POLYMERIZATION IN AQUEOUS DISPERSION

[75] Inventors: Dean R. Weimer; Albert M. Durr, both of Ponca City, Okla.

[73] Assignee: Continental Oil Company, Ponca City, Okla.

[22] Filed: Oct. 29, 1974

[21] Appl. No.: 518,425

[52] U.S. Cl. ............................. 526/74; 526/345; 526/200; 526/202; 526/217; 526/220; 526/330; 526/332; 526/271; 526/272; 526/341; 526/348

[51] Int. Cl.² ...................... C08F 2/20; C08F 14/06

[58] Field of Search ............... 260/92.8 W, 93.5 W, 260/89.5 AW, 89.1, 91.1 R, 88.7 D, 80 M

[56] References Cited
UNITED STATES PATENTS

| | | | |
|---|---|---|---|
| 3,373,150 | 3/1968 | Pears et al. | 260/92.8 W |
| 3,436,385 | 4/1969 | Mathieu | 260/92.8 W |
| 3,444,270 | 5/1969 | Aliberti et al. | 260/93.5 W |
| 3,515,709 | 6/1970 | Nelson et al. | 260/92.8 W |
| 3,757,001 | 9/1973 | Reiter et al. | 260/92.8 W |
| 3,778,423 | 12/1973 | Reiter et al. | 260/92.8 W |
| 3,804,924 | 4/1974 | Papetti et al. | 260/93.5 W |
| 3,855,190 | 12/1974 | Kurz et al. | 260/92.8 W |

*Primary Examiner*—Alan Holler
*Attorney, Agent, or Firm*—Cortlan R. Schupbach, Jr.

[57] ABSTRACT

Polymer deposit or build-up on the interior surfaces of a polymerization vessel during polymerization of monoethylenically unsaturated monomers in aqueous dispersion may be inhibited by adding certain heterocyclic compounds to the dispersion prior to polymerization.

6 Claims, No Drawings

TECHNIQUE FOR REDUCING POLYMER DEPOSIT DURING POLYMERIZATION IN AQUEOUS DISPERSION

This invention relates to a process for reducing undesirable polymer build-up on the interior surfaces of a polymerization vessel during polymerization of substantially water-insoluble monoethylenically unsaturated liquid monomer in aqueous dispersion. The invention has particular application to suspension homopolymerization and copolymerization of vinyl chloride.

Polymerization of water-insoluble monoethylenically unsaturated liquid monomers, such as vinyl chloride and the like, in aqueous dispersion is well known in the art, e.g. suspension polymerization. In such polymerizations the monomer is dispersed in the aqueous medium by means of agitation in the presence of a protective colloid to prevent coagulation of the monomer droplets and an oil-soluble polymerization initiator. During polymerization undesirable polymer build-up is produced on the interior surfaces of the polymerization vessel, particularly where such surfaces are exposed metal areas. This polymer build-up is undesirable from both process and product standpoints. With respect to the process, the polymer build-up reduces the heat transfer capability of the polymerization vessel. For this and other reasons, it is necessary to frequently interrupt the process and clean the equipment. From the product aspect, the adherence of the polymer to areas of exposed metal and subsequent peeling of the polymer results in contamination of the polymer product.

At least two methods have heretofore been suggested for reducing the polymer build-up in these polymerization systems. In U.S. Pat. No. 3,515,709, it is suggested to employ certain water soluble derivatives of amino polycarboxylic acids either as coatings on the interior surfaces of the polymerization vessel prior to conducting the polymerization or, alternatively, as additives to the polymerization media whereupon such derivatives preferentially deposit on the inner surfaces of the vessel during polymerization. However, the effectiveness of the water soluble derivatives of amino polycarboxylic acids is not wholly satisfactory. U.S. Pat. Nos. 3,669,946 and 3,778,423 disclose the use of certain compounds which must be coated on the interior surfaces of the vessel prior to polymerization. Such a technique, of course, suffers from the disadvantage of requiring a separate operation to prepare the vessel for polymerization as well as some periodic shutdowns to renew the coatings.

In accordance with this invention the disadvantages of the above suggested approaches are avoided in that certain heterocyclic compounds have been found to be more effective in reducing polymer build-up than the water soluble derivatives of amino polycarboxylic acids disclosed in U.S. Pat. No. 3,515,709 yet at the same time need not be precoated on the inner surfaces of the polymerization vessel prior to polymerization as is necessary in U.S. Pat. Nos. 3,669,946 and 3,778,423. Briefly described, the invention involves adding a polymer build-up inhibiting amount of a certain heterocyclic compound directly to the aqueous polymerization media prior to polymerization. Further, it has been found that the combination of the above mentioned heterocyclic compounds with certain alkylated copolymers of N-vinyl pyrrolidone monomers and alpha-olefins and/or certain water soluble derivatives of amino polycarboxylic acids provides even better inhibition of polymer build-up.

The heterocyclic compound used in accordance with the invention is benzotriazole, 2(2'-hydroxy-5'-methylphenyl) benzotriazole, tolyltriazole, and mixtures thereof. The amount of heterocyclic compound employed may vary considerably depending on the particular polymerization system and the degree of effect desired. Any amount will produce some inhibiting effect and, thus, it may be said that an inhibiting amount will be employed. In general, amounts in the range of about $1 \times 10^{-6}$ to $1 \times 10^{-1}$ phm (parts per 100 parts monomer, by weight) will be satisfactory for most situations with the preferred range being about $1 \times 10^{-5}$ to $1 \times 10^{-2}$ phm. It should be understood that these ranges are exemplary and lesser and greater amounts may be used to still obtain benefits of the invention.

The alkylated copolymers of N-vinyl pyrrolidone monomers and alpha-olefins are generally described in U.S. Pat. Nos. 3,423,381. Those which are contemplated for optional use in combination with the above described heterocyclic compounds may be defined as alkylated copolymers prepared by simultaneously copolymerizing and alkylating (1) an N-vinyl pyrrolidone having the formula

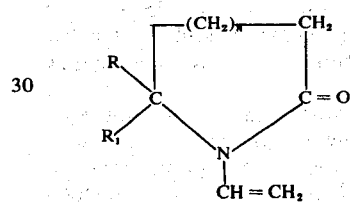

wherein
n is an integer of 1, 2, or 3;
R and $R_1$ are, independently, H, methyl, or ethyl;
with (2) an alpha-olefin having at least 2 carbons and, preferably, having from 2 to about 50 carbon atoms. Exemplary of the N-vinyl pyrrolidone monomers suitable for preparation of the copolymers include N-vinyl-5-methyl pyrrolidone, N-vinyl-5-ethyl pyrrolidone, N-vinyl-5,5'-diethyl pyrrolidone, N-vinyl pyrrolidone, and the like. These copolymers are commercially available.

The water soluble derivatives of amino polycarboxylic acids which are suitable for use in the invention are those described in U.S. Pat. No. 3,515,709. In particular, such water soluble derivatives include the alkali and alkaline earth metal salts of amino carboxylic acids selected from the group consisting of (1) amino acids represented by the formula:

wherein
R is a $-CH_2CH_2OH$ or $-CH_2CH_2CH_2OH$ group,
A is an alkylene group of 1 to 3 carbon atoms and
n is zero or an integer of 1 or 2;
and (2) polyamino acids represented by the formula:

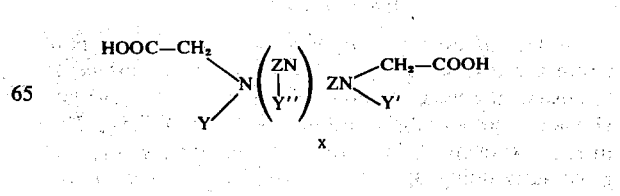

wherein Z is an alkylene group of 1 to 4 carbon atoms, x is zero or an integer of 1 to 4, Y and Y' are independently hydrogen, —$CH_2COOH$ or hydroxyalkyl, and Y'' is hydrogen or $CH_2COOH$. Preferably, the alkali or alkaline earth metals are sodium, potassium, barium, calcium, or lithium. Preferably, the amino acids are ethylene diamine tetraacetic acid or N-hydroxyethylethylene diamine triacetic acid.

The amount of each or either of the alkylated copolymers and water soluble salts of the amino polycarboxylic acids may vary considerably as is the case with the heterocyclic compounds. Usually, amounts in the range of about $1 \times 10^{-5}$ phm to about 5 phm, preferably $1 \times 10^{-4}$ phm to 1 phm, will be employed.

The heterocyclic compounds and the optional alkylated copolymers and/or water soluble amino salts are employed by simply adding them to the aqueous dispersion of monomer prior to polymerization.

The improvement of this invention is applicable to any process for polymerizing substantially water-insoluble monoethylenically unsaturated liquid monomer in aqueous dispersion. Exemplary of such monomers are vinyl halides such as vinyl chloride, vinylidene halides such as vinylidene chloride, vinyl alkanoates such as vinyl acetate and vinyl propionate, aromatic vinyl compounds such as styrene, vinyl ethers, acrylonitrile, acrylic and methacrylic acids and lower alkyl esters thereof, maleic and fumaric acids and anhydrides, and the like. Mixtures of such monomers may also be used.

Such processes are well known and employ suspending agents and oil soluble polymerization initiators. Any known suspending agent may be employed such as polyvinyl alcohol, polyvinyl acetate, vinyl acetate-maleic anhydride copolymer, styrene-maleic anhydride copolymer, polyacrylic acid, gelatin, starch, and various cellulose derivatives such as methyl cellulose, hydroxymethyl cellulose, hydroxypropylmethyl cellulose, and the like. Similarly, any oil-soluble initiator may be used such as oil-soluble hydroperoxides, acyl peroxide, benzoyl peroxide, lauroyl peroxide, di(secbutyl) peroxydicarbonate, isopropyl peroxydicarbonate, acetyl cyclohexylsulfonyl peroxide, dimethyl valeronitrile azobisisobutylonitrile, and the like. Frequently combinations of initiators are used as is known in the art.

The relative amounts of suspending agent, initiator, monomer and water for use in these aqueous dispersion polymerization systems are well known and may vary considerably. In addition, other conventional additives may be employed such as water-soluble or water-dispersable granulating and/or wetting agents and coagulants to aid in the formation of polymer particles of desired size and shape. Polymerization temperatures in the range of 20°C to 70°C are usually employed although in instances temperatures outside this range may be used as known in the art. Pressures in the range of 70 to 150 psig are generally employed as known in the art.

The following examples will serve to further illustrate the invention.

EXAMPLE 1

A series of experiments were conducted to demonstrate the effectiveness of the invention compared to the use of the water soluble salts of amino polycarboxylic acids alone as disclosed in U.S. Pat. No. 3,515,709. In each experiment, 50 pounds of deionized water, 13.1 g. of suspending agent (hydroxypropyl methyl cellulose), and a polymer build-up inhibiting agent as identified in the table were charged to an 8 gallon stainless steel polymerization vessel equipped with an agitator. The vessel was then sealed, evacuated and heated to about 55°C. Twenty-five pounds of vinyl chloride monomer was then charged to the vessel along with about 6.7 g. of di(secbutyl)peroxydicarbonate in 13.3 g. mineral spirits. Polymerization of the vinyl chloride then proceeded with an agitator speed of about 200 rpm.

After about 84 percent conversion of the monomer had taken place as determined by the pressure drop in the reactor the agitation was stopped and the vessel was vented and opened. The inner surfaces of the vessel were visually examined for polymer build-up and rated on a scale of 0 to 10 with zero being no polymer build-up and 10 being a very heavy build-up requiring mechanical scrubbing to remove.

Table 1

| Experiment No. | Polymer Build-Up Inhibiting Agent | Amount (phm) | Rating |
|---|---|---|---|
| 1 | Tetrasodium salt of ethylene diamine tetraacetic acid | $6.7 \times 10^{-2}$ | 10 |
| 2 | Benzotriazole | $8.6 \times 10^{-3}$ | 7 |
| 3 | Benzotriazole | $4.3 \times 10^{-3}$ | 5 |

EXAMPLE 2

A series of experiments were conducted to determine the effectiveness of mixtures of benzotriazole, 2(2'-hydroxy-5'-methyl-phenyl) benzotriazole, and tolyltriazole with water-soluble salts of amino polycarboxylic acids and alkylated copolymers hereinbefore described in preventing polymer scale build-up in a polymerization reaction during the polymerization of vinyl chloride monomer. In each experiment an 8 gallon stainless steel reactor was employed for the polymerization reactions. The reactor was charged with 50 pounds of deionized water, 13.1 grams of hydroxypropyl methyl cellulose, a suspending agent and varying amounts of the polymer build-up inhibiting compounds set forth in the following table. The reactor was then sealed, evacuated to remove air from the system, and then heated to 55°C. A mixture containing 25 pounds of vinyl chloride monomer, 6.7 grams of di(secbutyl)-peroxydicarbonate and 13.3 grams of mineral spirits was added to the reactor. During the polymerization, the stirrer employed for agitation of the polymerization mixture was operated at 200 rpm.

When approximately 84 percent conversion of vinyl chloride monomer to polymer had taken place as determined by the pressure drop in the reactor the agitation was stopped, the reactor vented, and the reactor opened. The polymer formed during the polymerization reaction was removed and the polymerization reactor was examined to determine the amount of polymer deposit build-up and the ease with which the build-up could be removed. The results of the evaluations are tabulated in the following table using a scale of 0 to 10 with 0 representing no polymer deposit build-up and 10 being a very heavy build-up requiring mechanical scrubbing to remove.

Table 2

| Experiment No. | Polymer Build-Up Agents | Amount (phm) | Rating |
|---|---|---|---|
| 1 | Benzotriazole | $9.5 \times 10^{-4}$ | 2 |
|   | Na EDTA* | $6.7 \times 10^{-2}$ |  |
| 2 | Benzotriazole | $1.9 \times 10^{-3}$ | 1+ |
|   | Na EDTA | $6.7 \times 10^{-2}$ |  |
| 3 | Benzotriazole | $4.3 \times 10^{-3}$ | 2 |
|   | Na EDTA | $6.7 \times 10^{-2}$ |  |
| 4 | Benzotriazole | $8.6 \times 10^{-3}$ | 4 |
|   | Na EDTA | $6.7 \times 10^{-2}$ |  |
| 5 | Benzotriazole | $1.9 \times 10^{-3}$ | 1 |
|   | Na EDTA | $6.7 \times 10^{-2}$ |  |
|   | Alkylated Copolymer** | $1.9 \times 10^{-3}$ |  |
| 6 | Benzotriazole | $1.9 \times 10^{-3}$ | 1 |
|   | Na EDTA | $6.7 \times 10^{-2}$ |  |
|   | Alkylated Copolymer | $1.9 \times 10^{-2}$ |  |
| 7 | 2(2'-hydroxy-5'-methylphenyl)benzotriazole*** | $1.9 \times 10^{-3}$ | 1+ |
|   | Na EDTA | $6.7 \times 10^{-2}$ |  |
| 8 | Tolytriazole | $1.9 \times 10^{-3}$ | 1+ |
|   | Na EDTA | $6.7 \times 10^{-2}$ |  |
| 9 | Na EDTA | $6.7 \times 10^{-2}$ | 10 |
| 10 | Methylene bis(benzotriazole)**** | $1.9 \times 10^{-3}$ | 10 |
|   | Na EDTA | $6.7 \times 10^{-2}$ |  |

*tetrasodium salt of ethylenediamine tetraacetic acid
**olefin alkylated polymer of vinyl pyrrolidone (GANEX P804)
***TINUVIN P
****REOLUB CI-4

EXAMPLE 3

The polymer products of experiment No. 2 and experiment No. 9 in Table 2 were tested for heat stability and it was found that polymer No. 2 had significantly better heat stability over polymer No. 9.

Thus, having described the invention in detail it will be understood that certain variations and modifications may be made without departing from the spirit and scope of the invention as defined herein and in the appended claims.

We claim:

1. A method for inhibiting polymer build-up on the interior surfaces of a polymerization vessel during the polymerization of substantially water-insoluble mono-ethylenically unsaturated liquid monomer in aqueous dispersion comprising adding a polymer build-up inhibiting amount of a heterocyclic compound to the aqueous dispersion prior to polymerization, said heterocyclic compound being benzotriazole, tolyltriazole, 2(2'-hydroxy-5'-methylphenyl) benzotriazole, or mixtures thereof.

2. A method according to claim 1 wherein an alkylated copolymer is employed in addition to the heterocyclic compound, said alkylated copolymer being prepared by simultaneously copolymerizing and alkylating (1) an N-vinyl pyrrolidone having the formula

[structure: N-vinyl pyrrolidone ring with $(CH_2)_n$, $CH_2$, $C=O$, R, $R_1$, $N$, $CH=CH_2$]

wherein
  $n$ is an integer of 1 to 3; R and $R_1$ are, independently, H, methyl, or ethyl;
and (2) an alpha-olefin having at least 2 carbon atoms.

3. A method according to claim 1 wherein an alkali or alkaline earth metal salt of an amino carboxylic acid is employed in addition to the heterocyclic compound, said amino polycarboxylic acid being defined by (1) amino acids having the formula $$(R)_n N + A - COOH)_{3-n}$$

wherein
  R is a $-CH_2CH_2OH$ or $-CH_2CH_2CH_2OH$ group,
  A is an alkylene group of 1 to 3 carbon atoms and
  $n$ is zero, 1 or 2; or
(2) polyamino acids having the formula

[structure: $HOOC-CH_2$, $CH_2-COOH$, N, ZN, Y'', Y, Y', x]

wherein
  Z is an alkylene group of 1 to 4 carbon atoms; $x$ is zero, 1, 2, 3 or 4;
  Y and Y' are, independently, hydrogen, $-CH_2COOH$ or $C_1$-hydroxyalkyl; and
  Y'' is hydrogen or $-CH_2COOH$.

4. A method according to claim 1 wherein the heterocyclic compound is benzotriazole.

5. A method according to claim 3 wherein benzotriazole and the tetrasodium salt of ethylenediamine tetraacetic acid are employed.

6. A method according to claim 3 wherein in addition to the amino polycarboxylic acid and the heterocyclic compound, an alkylated copolymer prepared by simultaneously copolymerizing and alkylating (1) an N-vinyl pyrrolidone having the formula:

[structure: N-vinyl pyrrolidone ring with $(CH_2)_n$, $CH_2$, $C=O$, R, $R_1$, N, $CH=CH_2$]

wherein
  $n$ is an integer of from 1 to 3,
  R and $R_1$ are, independently, hydrogen, methyl, or ethyl, and
(2) an alpha-olefin having at least 2 carbon atoms, is employed.

* * * * *